Sept. 5, 1939.　　　G. ZIGUELDE　　　2,172,078
ACCOUNTING MACHINE
Filed Dec. 2, 1933　　　7 Sheets-Sheet 1

INVENTOR.
Georges Ziguelde
BY
ATTORNEYS.

Sept. 5, 1939.  G. ZIGUELDE  2,172,078
ACCOUNTING MACHINE
Filed Dec. 2, 1933   7 Sheets-Sheet 2

INVENTOR.
Georges Ziguelde
BY
ATTORNEYS.

Sept. 5, 1939.　　　　G. ZIGUELDE　　　　2,172,078
ACCOUNTING MACHINE
Filed Dec. 2, 1933　　　7 Sheets-Sheet 4

FIG.1d.

INVENTOR.
Georges Ziguelde
BY
ATTORNEYS.

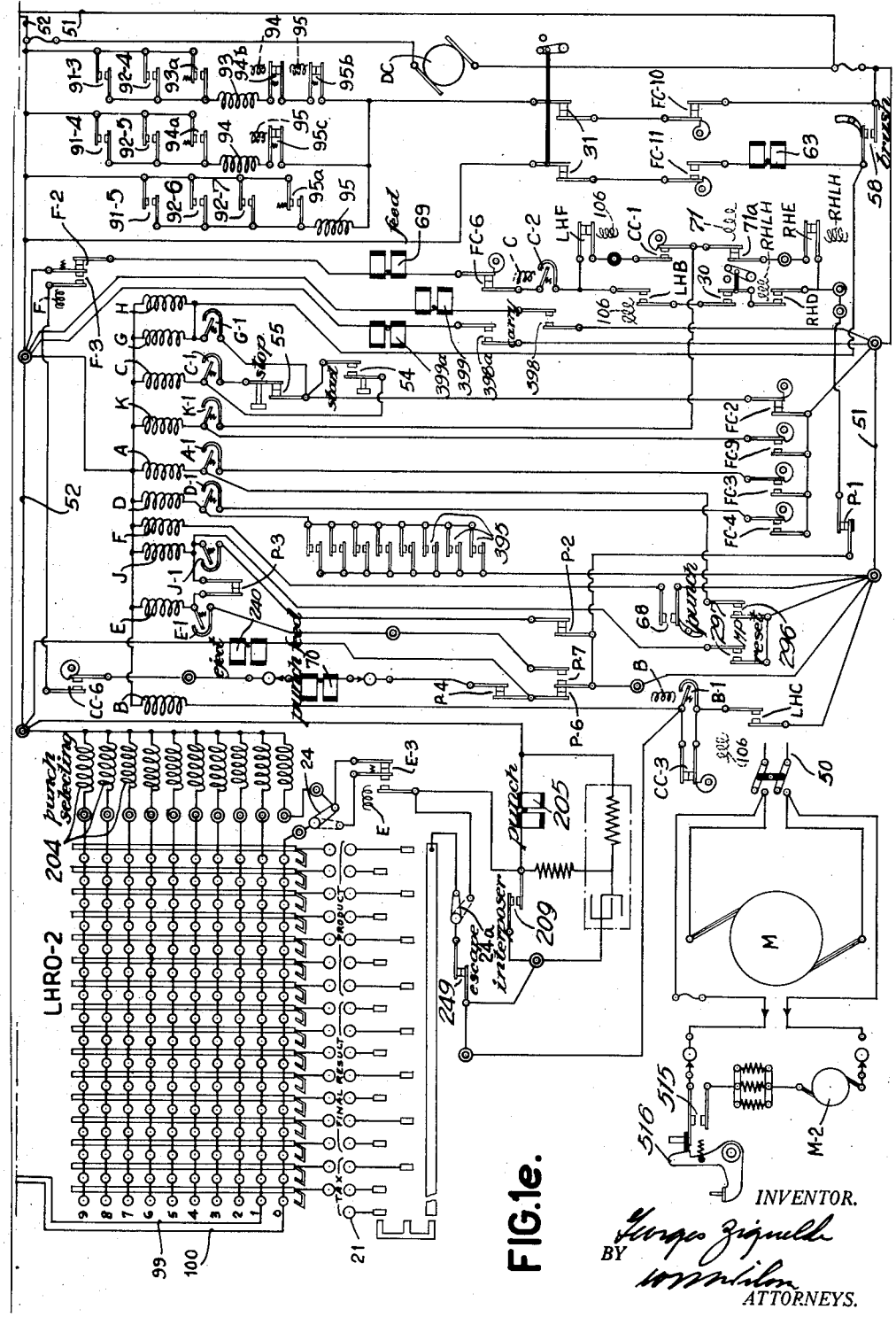

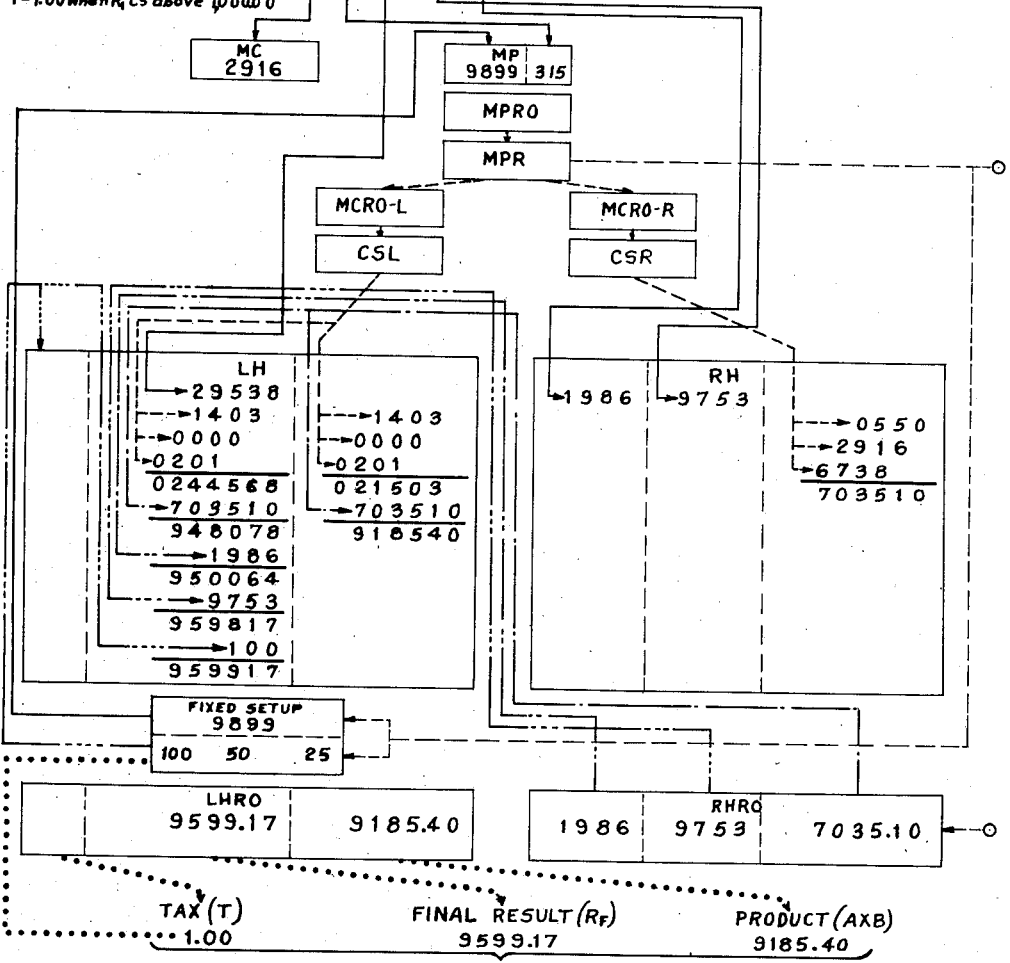

Sept. 5, 1939.   G. ZIGUELDE   2,172,078
ACCOUNTING MACHINE
Filed Dec. 2, 1933   7 Sheets—Sheet 7

FIG. 3.

| IDLE RH TO LH TRANSFER<br><br>RESET MC AND MP | PUNCH TAX, TOTAL RESULT AND PRODUCT<br><br>RESET RH | RESET LH | ←—CARD FEED CYCLE—→<br>READ<br>A To MC<br>B To MP<br>C To LH 8-14<br>D To RH 8-11<br>E To RH 2-15<br>ENTER 9899 IN MP | |
|---|---|---|---|---|
| TRIP MASTER COLUMN SKIP MAGNET<br><br>TRIP PUNCH CARD FEED MOTOR | MULTIPLY | RH 1-7 To LH 1-7<br><br>RH 1-7 To LH 8-14 | RH 12-15(E) To LH 8-14 | RH 8-11(D) To LH 8-14 | STAMP To LH 8-14 LH 15-16 |

FIG. 4.

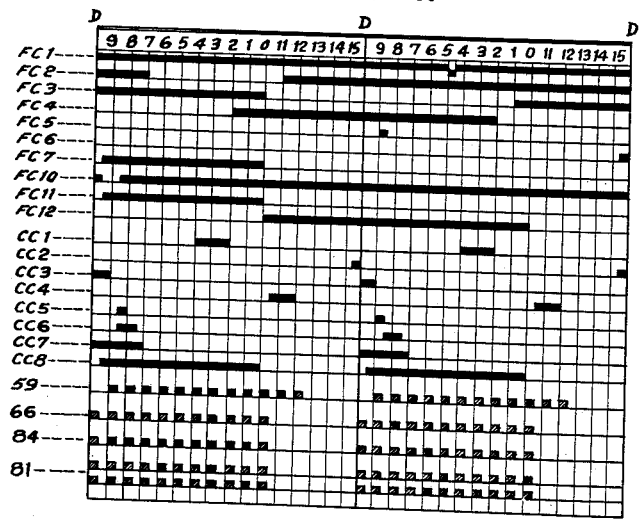

INVENTOR
Georges Ziguelde
BY
ATTORNEY

Patented Sept. 5, 1939

2,172,078

UNITED STATES PATENT OFFICE 2,172,078

ACCOUNTING MACHINE

Georges Ziguelde, Paris, France, assignor to International Business Machines Corporation, New York, N. Y., a corporation of New York Application December 2, 1933, Serial No. 700,734
In France December 6, 1932

11 Claims. (Cl. 235—61.7)

The present invention relates, in a general manner, to accounting machines and more especially to accounting machines controlled by perforated cards and which make perforations in the cards.

Certain former machines made it possible to analyse, from a perforated card, two factors of a to be performed calculation, said factors being represented by perforations in said card, to then multiply said two factors and register the product, then to record the product by the punching of corresponding designating perforations in the actual card from which the factors of the calculation were drawn.

The object of the present invention is improvements to such machines in order to obtain, in the course of a single passage of the card through the machine, not only the multiplication of the two factors perforated in said card, but also other operations such as the addition to the aforementioned product of other terms also perforated in the card.

The improved machine which forms the subject matter of the invention is particularly suitable for the automatic preparation of electricity or gas bills; it is this application which will be described more particularly in the following specification but it is evident that the machine in question can be used in other cases for solving similar problems.

In the case of an electricity bill for instance, the improved machine, according to the invention, will make it possible to multiply the consumption in energy by the unit price in order to obtain the amount due for consumption, to add fixed amounts (the hire of fittings, of meters, of main wiring, etc.,) to said amount due for consumption, to determine the stamp duty which is to be added to the amount due as established by the above additions, in order to obtain the total amount, to perforate the amount of the consumption, the amount of the stamp duty and finally the total amount due, in the card. The card thus punched with all these indications can then be introduced into a printing tabulating machine for the printing of the corresponding bill.

In order to effect the multiplication, devices provided in ordinary multiplying and perforating machines will be used; the product will finally be registered in one of the accumulators of the machine, at two different locations or zones in said accumulator (instead of being set up in a single zone of the accumulator as heretofore).

One of the factors to be added will be directly registered in the second zone of the aforementioned accumulator whereas the other two factors to be added, for instance, will first be registered on another accumulator and then successively transferred to the second zone of the first aforementioned accumulator.

In order to effect the successive transfers into the first aforementioned accumulator, certain denominational order positions of the readout where the multiplier is set up are used, said positions being selected among those positions which are not utilized for the setting up of the multiplier itself; said positions are suitably connected to relays the energizing of which causes the closing of groups of contacts which permit of the transfer from one accumulator to another. In order to determine the stamp which should be set up in a third zone of the aforementioned accumulator, as well as in the second zone where the total amount is set up, a group of contacts and relays is used, the peculiar organization of which will be described later.

The effect of the registering of all this data in the aforementioned accumulator is to provide a control for the punches of the punching section of the machine so that said punches may perforate the cards with the data thus registered.

The present invention has for one of its objects the provision of improvements in calculating machines to the general end that the product as obtained by the machine may be augmented by other data derived from the record.

A further object of the present invention resides in the provision of an accounting machine in which multiplying operations may be carried out with means for augmenting the calculated products by other amounts and then determining the relative magnitude of this intermediate result and then automatically augmenting the intermediate result by another amount, which is a variable one depending upon the magnitude of the intermediate result.

A further object of the present invention resides in the provision of a calculating machine with means for automatically ascertaining the relative magnitude of a result computed by the machine and for selecting an amount from a plurality of amounts in accordance with the relative magnitude of such result and for introducing such selected amounts into the machine to augment the result previously calculated by the machine.

A further object of the present invention resides in the provision of a calculating machine with means for automatically ascertaining by the operation of the machine itself the relative magnitude of the result computed by the machine and for then selecting an amount from a plurality of amounts in accordance with the relative magnitude of such previously computed amount and for recording such amount.

A further object of the present invention resides in the provision of a calculating machine adapted to effect calculations of the general form $(A \times B) + C + D + E = R - 1$ and to also perform calculations of the general form $R - 1 + T = R$, where T is an amount based upon the magnitude of $R - 1$ and where R is the final result.

A further object of the present invention resides in the provision of a machine adapted to effect the foregoing calculations and to finally record R, $A \times B$ and T.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figs. 1a, 1b, 1c, 1d and 1e, taken together and arranged vertically in the order named, show the circuit diagram of the machine;

Fig. 2 is a diagrammatic view showing the flow of entries in the machine and the manner in which a typical computation is handled.

Fig. 3 is a diagram showing the sequence of operations of the machine for the special computations performed.

Fig. 4 is a timing diagram of the cam controlled contacts of the machine.

Figure 1A:
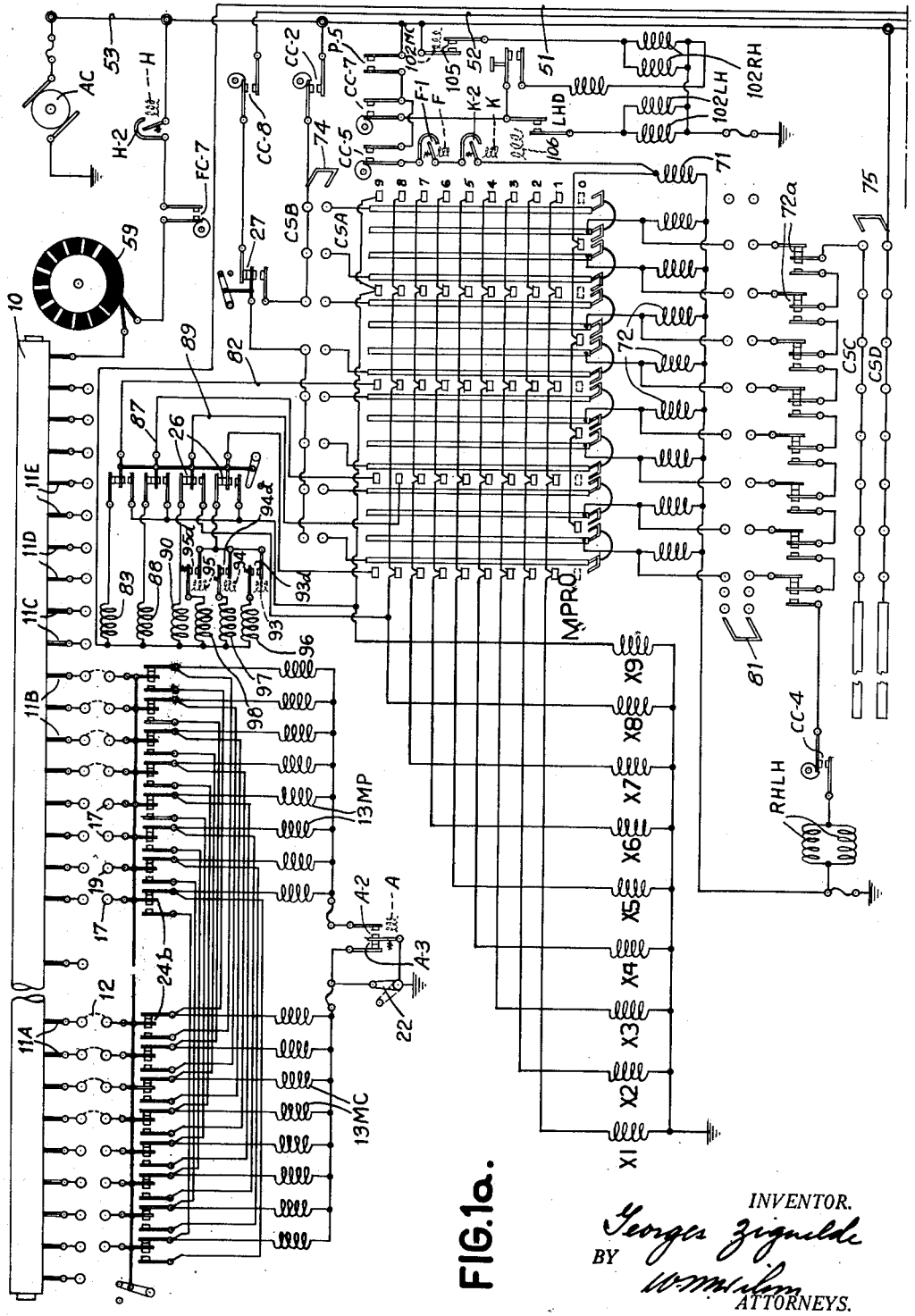

The machine to which the present invention is shown applied, is substantially the machine shown and described in French Patents Nos. 747,325, 747,326, and 747,327. See also corresponding British Patent No. 405,031.

Before describing the novel features of the present invention the following explanation will be made.

The cards which are to be used in the operation are pre-punched with data A, B, C, D and E, representing various terms of the to be performed computation. The A term represents the multiplicand, the B term the multiplier and the C, D and E terms, the supplemental charges. It will be assumed that $R - 1$ represents the intermediate result computed by the operation of the machine, i. e. $R - 1 = (A \times B) + C + D + E$. Upon the obtaining of the intermediate result $R - 1$, the machine, so to speak, inspects $R - 1$ for relative size or magnitude thereof and depending upon the relative size or magnitude of this intermediate result $R - 1$, it enters into the machine a selected amount T, adding T to $R - 1$ to get a final result of R.

The machine after computing the foregoing, records back upon the record from which the original terms were derived, the product of $A \times B$, the final result R and the amount T or amount of the tax.

It may be stated that generally the machine to which the present improvements are shown as applied, is the same as the machine fully described in the aforementioned patents and the manner of multiplication and the general manner of cycle control is substantially as set forth therein.

In handling a computation, the usual multiplicand brushes read the multiplicand term A from the record and control the entry of such term into the multiplicand entry device. The multiplier term is likewise read from the record and entered into the multiplier entry device. The C term, which relates to fixed charges, is read from the record by special brushes allotted to such term and such term is entered into a particular allotted section or zone of the LH accumulator. The D and E terms are likewise read from the record and are directly entered into allotted sections or zones at the left hand end of the RH accumulator. The machine then effects multiplication in the customary manner, introducing left hand components of partial products into the right hand section of the LH accumulator and right hand components of partial products into the right hand section of the RH accumulator. Thereafter the machine gathers together the RH components of products and transfers them over from the RH accumulator to the LH accumulator entering them into the right hand end of such accumulator.

Concurrently with such entry into the right hand end of the LH accumulator, the same partial product entries are directed into the left hand end of the LH accumulator, which section of the accumulator, it will be recalled, had previously received the C term of the computation.

Following the foregoing operation, there are further transfer over cycles in which the E term is derived from the left hand end of the RH accumulator and transferred over into the left hand end of the LH accumulator, after which the D term is likewise transferred over from the left hand end of the RH accumulator to the left hand end of the LH accumulator. The left hand end of the LH accumulator will then have standing in it the product of $(A \times B) + C + D + E$ or the intermediate result $R - 1$ and the other or right hand end of this accumulator will have in it simply the product of $A \times B$. The setting of the left hand end of the LH accumulator will be a variable one depending upon the particular terms which enter into the calculation $$(A \times B) + C + D + E = R - 1$$

and the machine will automatically ascertain the relative magnitude of $R - 1$ (the intermediate result) and in accordance therewith select one of a predetermined set of supplemental amounts, i. e. tax or stamp tax amounts (for example 25 cents, 50 cents or $1.00) and automatically effect the addition of the selected amount to $R - 1$ to obtain the final result R in the left hand section of the LH accumulator. The machine will also retain a set up of the selected tax for subsequent recording of such tax amount. It may be mentioned that certain tax amounts are set up by the operation of the machine in heretofore unused columns of the LH accumulator.

After the foregoing operations are completed the LH accumulator will have set up in one portion thereof (the extreme right portion) the product of $A \times B$. In the intermediate portion (columns 8 to 14 inclusive) the final result R will be set up and in columns 15 and 16 (the extreme left hand columns) the tax amount T will be set up, provided the tax is 25 cents or 50 cents. The $1.00 tax is retained elsewhere as will be explained later.

The machine is then ready to record the result R, the amount of the tax T and the amount of the product of $A \times B$, back on the record from which the factor data was derived. This is effected by reading out and controlling the punch from both the right hand section and the left hand section of the LH accumulator. Having generally explained the mode of operation, the circuit diagram and a more detailed statement of operation of the machine will now be set forth.

*Circuit diagram*

Referring to the circuit diagram, Fig. 1a, the machine includes the usual contact roll 10, having sensing brushes 11, cooperating therewith. The brushes 11A, designate the multiplicand sensing brushes, 11B the multiplier sensing brushes, 11C, 11D and 11E represent the sensing brushes for the other terms C, D and E. On the circuit diagram only a few of such brushes are shown, but it will be understood that a greater number can be used depending upon the magnitude of the terms to be read.

*Plug connections*

The usual plug connection are made at plug board 12, to direct the multiplicand and multiplier entries respectively into the multiplicand and multiplier registers. 13MC designates the multiplicand accumulator magnets, 13MP the multiplier accumulator magnets. Other plug connections are made at plug board 12 for the C, D and E entries. The C entries are made in the following manner. From plug sockets at plug board 12 (Fig. 1a), plug connections are made to sockets 14 (Fig. 1d) so that the C term may be entered when the contacts of the associated relay are closed, directly into certain columns of the left hand section of the LH accumulator, 13LH is a general reference numeral representing the accumulator magnets of such accumulator.

For entering the D term, plug connections are made from the sockets at plug board 12 (Fig. 1a) to certain allotted sockets 15 (Fig. 1c) so that entries may be made into certain sections or zones of the RH accumulator (13RH designating the accumulator magnets of such accumulator).

For entering the E term, plug connections are made from sockets of plug board 12 (Fig. 1a) to other of the fifteen sockets (Fig. 1c) to the left of the sockets receiving the D term entries. In practice four columns might be allotted to E and the next four might be allotted to D.

*Readout devices*

The multiplicand entry device has associated with it a multiplicand readout device which is of dual character. One readout section is for controlling left hand components and the other for controlling right hand components. The multiplicand readout is designated MCRO left and MCRO right and is shown on Fig. 1c of the circuit diagram. The multiplier entry device likewise has its usual readout associated therewith. This is shown at MPRO (Fig. 1a). It may be here explained that in computing with the present machine the multiplier term of the computation or the B term does not exceed three columns. Accordingly, since the multiplier entry device has greater columnar capacity than three columns, other columns of the multiplier entry device and of its associated readout sections are available for other purposes. These are utilized in the present machine for controlling the cross-adding cycles which follow the actual multiplying of the A term by the B term. The machine also includes a right hand accumulator readout designated RHRO (Fig. 1d) and there are also two LHRO readouts, one designated LHRO—1 on Fig. 1d and the other LHRO—2 on Fig. 1e. It may be explained that the LH readout is of the usual dual type and in actual construction the two readouts LHRO—1 and LHRO—2 are interspersed.

As previously explained, the MP entries only go into the three right hand columns of the MP entry device, but other setting up entries are made into other columns as will now be explained.

Referring to Fig. 1d, plug connections are made from sockets 16 (Fig. 1d) to sockets 17 (Fig. 1a). A single plug connection is made from socket 18 (Fig. 1d) to socket 19 (Fig. 1a). By these plug connections there will be an entry made into the extreme left hand columns of the MP entry device of 9899. These entries are derived from an emitter and are used for setting up the readout for controlling cross-footing operations as will be subsequently explained.

In certain cases, where the full columnar capacity of the LH accumulator is utilized in the computation, an extra column may be required for introducing into the record a certain columnar component of a tax term. Accordingly, for this purpose, a plug connection is made from socket 20 (Fig. 1d) to socket 21 of the punch readout strip (Fig. 1e).

*Hand switches*

The machine includes a number of hand setup switches which may be pre-set by hand before the calculation is started so that the machine can handle special calculations of the general type explained above as well as ordinary multiplying operations. In the circuit diagram, all of the switches are shown in the position for the special calculations which the machine is intended to perform. The switches which are usually provided in machines of this class and which have no particular function with respect to the special calculations of the present invention, will be first briefly mentioned. Switch 22 is the switch which is used for controlling the machine for regular operations or rate card control. Switch 23 (Fig. 1d) is also a regular switch used for regular operations or rate card operations. Switch 24 is also used in regular and rate card operations (see Fig. 1e). Switch 25 (Fig. 1d) is for fixed multiplier operations only. Switch 24a (Fig. 1e) is a switch used in connection with switch 24b (Fig. 1a) for adapting the machine to perform checking operations when the machine is used for a simple multiplier.

*Special switches for special calculations*

Referring to Fig. 1a, reference character 26 designates a multiple point, manually controlled gang switch which is shifted to the position shown when the machine is to carry out the special computations of the present invention. With the switch in its other position the machine is adaptable for ordinary multiplying. Briefly, the function of the switch 26 is to connect certain of the left hand columns of the MPRO readout to a set of relay coils shown to the left of the switch 26.

Switch 27 (Fig. 1a) is likewise shifted to the position shown for special calculations and to reverse positions for ordinary multiplying. The function of this switch is to interrupt a cycle controller circuit and place the left hand section of the MPRO readout under control of additional cam contacts CC—8.

Switch 28 (Fig. 1d) is a switch which, when thrown to the position shown, permits concurrent entry of certain amounts into the left hand section of the LH accumulator and into the right hand section of the same accumulator. When the switch is in open position, entries only go into the right hand section of this accumulator, this being for partial product entries on regular multiplying.

Switch 29 (Fig. 1d) is a multi-point switch, manually settable and which in the position shown, cuts out of circuit the usual RH to LH transfer contacts and puts other special controlling contacts into circuit.

Switch 30 (Fig. 1e) is a switch manually settable and which in the position shown alters the machine timing relations so that the supplemental calculating cycles can be introduced after multiplying.

Switch 31 (Fig. 1e) is another manually settable switch shifted to the position shown when the machine is to handle special calculations and shifted to open position for regular multiplying. The purposes of this switch is to close contacts in circuit with cam contacts FC—10 and FC—11. The purpose of these cam contacts will be described later.

Switches 26 to 31 are all of manually settable type and in actual practice these switches may be arranged so as to be controllable by the setting of a single lever. For clarity upon the circuit diagram these switches have been shown grouped and independently operable.

Operations

In following the operations of the machine, reference may be made to Figs. 3 and 4 for the time of operation of the contacts involved and for the sequence of operations involved. In starting up the machine after the pre-punched cards are placed in the usual supply magazine, the first operation is to close a switch 50, to supply current to the main driving motor M (Fig. 1e). The motor M drives the A. C.-D. C. generator, so labelled (Figs. 1a and 1e) to supply direct current to D. C. lines 51 and 52. Alternating current is likewise supplied to ground and to a line 53 (Fig. 1a). The start key 54 (504 of British Patent No. 405,031) is now depressed, which completes a circuit from the D. C. line 52, through a relay coil C and back to the D. C. line. The coil C establishes a holding circuit through its contacts C—1, stop key contacts 55 (505 of British Patent No. 405,031) now closed and cam contacts FC—2, now closed, to the line 52. The coil C when energized also closes its contacts C—2 and a circuit is completed from line 51 through the closed F—2 contacts, feed clutch magnet 69 (506 of British Patent No. 405,031), cam contacts FC—6, contacts C—2, contacts LHF now closed, cam contacts CC—1, which close at the proper time in the cycle, contacts 71A associated with the master magnet 71 of the cycle controller, contacts RHE now closed, and contacts P—1 to line 51. Relay coil F is energized when a card has been fed to the punching section of the machine, it being energized by the closure of card lever contacts 68 (120 of British Patent No. 405,031). In starting up machine, it is necessary to hold down the start key 54 during the first complete card feed cycle (i. e. through two counter-cycles) or alternatively, to depress the start key a second time. At the beginning of the second card feed cycle, the card traverses the reading brushes 11 and the multiplier and multiplicand are entered into the multiplier and multiplicand entry devices. During this same cycle the C term is entered into the left hand section of the LH register. To provide for the entry of the C term cam contacts FC—11 (Fig. 1e) close to energize relay magnet 63. Upon energization of this magnet (see Fig. 1d) relay contacts 63a close and permit the entry of the C term into the related columns of the left hand section of the LH register. Likewise during the same entering cycle, the D and E terms are entered into the left hand section of the RH register through the plug connections previously mentioned. The entry of the various amounts in the various registers is controlled by the usual card lever contacts 58 (113 of British Patent No. 405,031) which close a circuit through relay coil H (see Fig. 1e).

The feed of a card closes card lever contacts 58 (Fig. 1e) and energizes relay coils G and H. The energization of coil G closes stick contacts G—1 to maintain the relay coils G and H energized as long as cards are in the machine. Cam contacts FC—2 overlap in their action with the card lever contacts 58 to maintain the coils G and H energized so long as cards are in the machine. With the running out of cards the contacts 58 open so that upon opening of FC—2, the coils G and H will become deenergized. With relay coil H energized, relay contacts H—2 (Fig. 1a) close. Accordingly, alternating current impulses will be supplied from line 53, through the now closed H—2 contacts, through the FC—7 cam contacts now closed, to the distributor 59. The distributor 59 in turn supplies the impulses to the conductor roll 10. With current impulses thus supplied to roll 10, the A term is entered into the MC entry device, the B term is entered into the MP entry device, the C term is entered into certain columns of the left hand section of the LH accumulator (see Fig. 1d) and the D and E terms are entered into certain allotted columns of the left hand section of the RH accumulator (see Fig. 1c).

During the entry of the multiplier term into the machine, relay contacts A—2 will be in shifted position from that shown in Fig. 1a, being thus shifted by energization of relay coil A. The control for relay coil A is fully described in the aforementioned French and British patents. To provide for the entry of the C term, relay contacts 63a (Fig. 1d) must be closed. This is provided for by energizing relay coil 63. Relay coil 63 is energized with the card lever contacts 58 closed (see Fig. 1e) at the time when cam contacts FC—11 close and with switch 31 in closed position as shown.

Figure 1B:
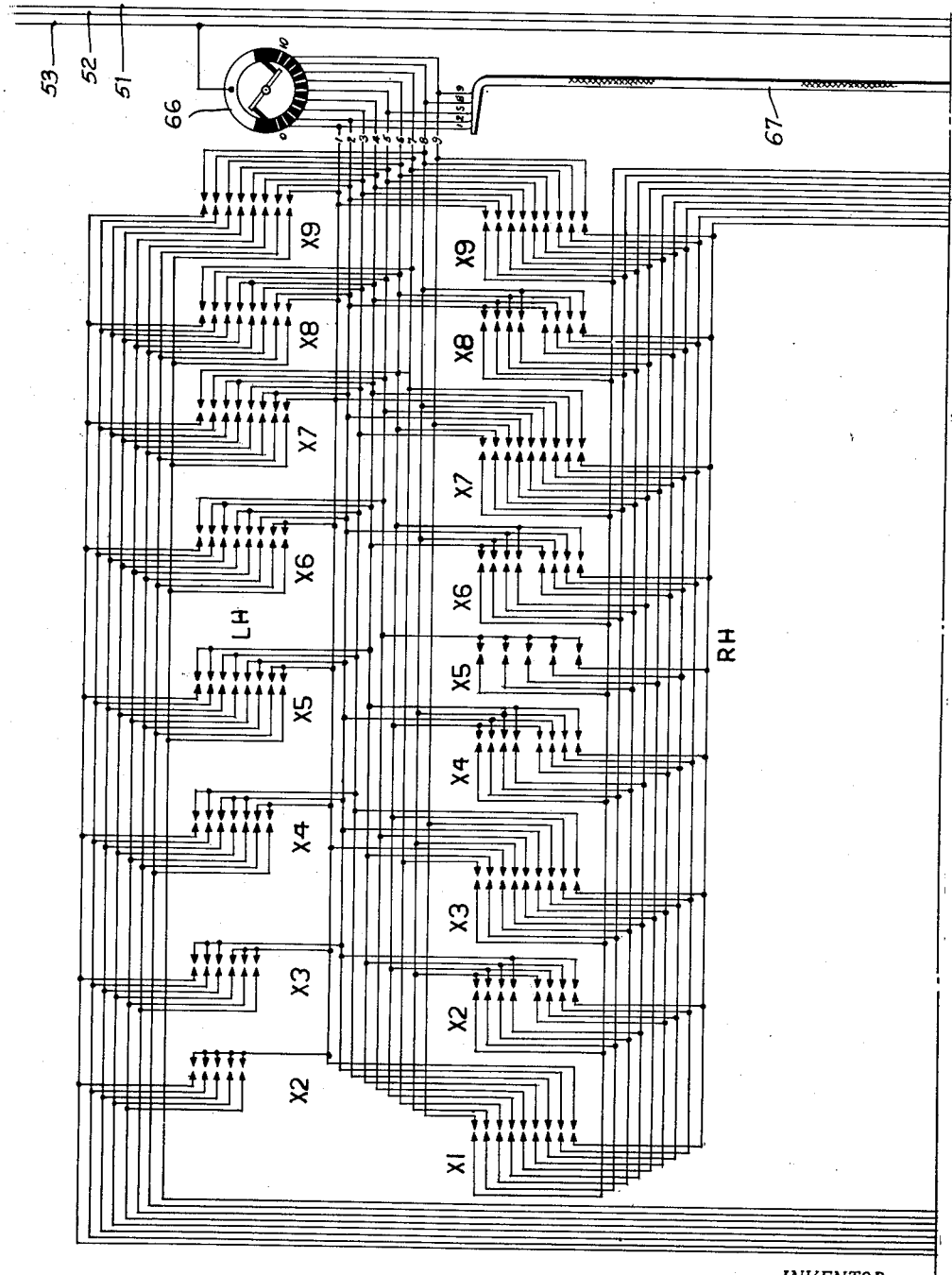

Concurrently with the entry of the multiplier term B into the MP entry device, there is an entry of an arbitrary control amount 9899 into the four left hand columns of this multiplier entry device. This entry is provided for by the relay contacts 63b (Fig. 1d). These contacts are in two sets, three of them which are connected to the 16 plug sockets being also connected to the "nine" impulse line extending to the emitter 66, via wires in a cable 67 (see Figs. 1b, 1c and 1d). The other contact of the 63b set which is connected to the 18 plug socket, is wired to the "eight" impulse line in cable 67. With the emitter in operation and with contacts 63b closed, an amount of 9899 will be entered into the four columns of the MP entry device to the extreme left.

After the card has been read, it is carried over by the various feed rolls of the machine into the punching unit. As the cord is carried over into this unit, card lever contacts 68 close, energizing relay coil F (Fig. 1e). With relay coil F energized, relay contacts F—3 will close and relay contacts F—2 will open. The opening of contacts F—2 discontinues the card feed by de-energizing the one revolution clutch magnet 69. The closure of contacts F—3 establishes a circuit from line 52, through contacts F—3, cam contacts CC—6, to the magnet 70 (175 of British Patent No. 405,031) of the punching mechanism to call the clutch mechanism of the punch unit into operation. The cards are handled in the card handling and punching mechanisms in the customary manner as set forth in the above mentioned foreign patents.

As the card leaves the card feeding unit and is transferred into the punching section of the machine, the actual operation of multiplying starts. Relay contacts F—1 will be closed when relay coil F is energized. With such relay contacts F—1 (Fig. 1a) closed, current can flow from line 53, through contacts P—5, in the punch, through cam contacts CC—5, through contacts F—1, relay contacts K—2, the master magnet 71 (312 of British Patent No. 405,031) of the cycle controlling unit and back to ground. Concurrently with the energization of 71, current will flow to the zero segments of the MPRO readout. If any of the brushes of the MPRO readout stand upon zero, selected ones of the magnets 72 (311 of British Patent No. 405,301) will be energized according to which denominations of the multiplier contains zero. The energization of master magnet 71 calls the cycle controller into operation and the cycle controller immediately shifts to the first position in which there is a significant figure in the multiplier. This shifting action of the cycle controller sets up all of the cycle controller column shift control brushes 73 (Fig. 1c) to a position corresponding to the first denomination in which there is a first significant figure in the multiplier. For example, if the multiplier was 75, the brushes 73 would all shift until they stand upon the units spots, on the other hand, if the multiplier was 80, the brushes would shift to the second set or tens spots. After column shift under control of the cycle controller, cam contacts CC—2 (Fig. 1a) close.

Assuming that the multiplier term was 75, brushes 74 and 75 will step to the units column so that the units contact of the CSB set is connected to the units contact of the CSA set by brush 74. Likewise the units contact of the CSC set of contacts will be connected to the units contact of the CSD set by brush 75. With these brushes in such position, upon closure of cam contacts CC—2, a circuit will be completed through the five spot of the readout to the X—5 multiplier magnet. With X—5 energized, the related contacts of the corresponding times 5 multiplier relay shown on Fig. 1b, will become closed and with the emitter 66 in operation, impulses will be emitted through the contacts of the times 5 multiplier relay through the MCRO left and MCRO right readouts and partial product entries will be directed into the LH accumulator and the RH accumulator in the manner fully described in the aforementioned French and British patents.

Figure 1C:
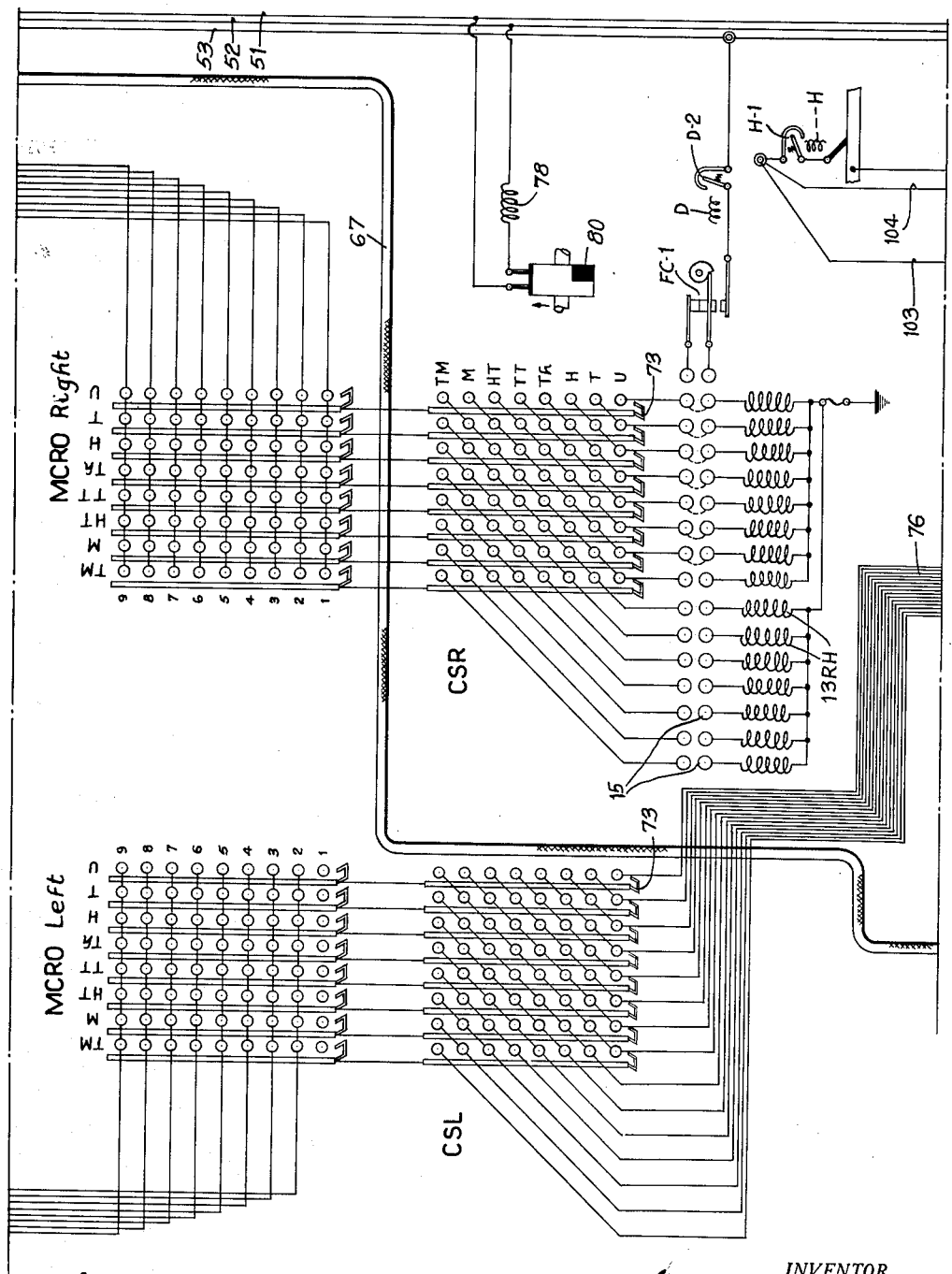

Referring now to Figs. 1c and 1d, the left hand component entries flow from the MCRO left readout by entry lines generally designated 76.

Referring now to Fig. 1d, it will be noted that the circuits 76 extend through relay control contacts RHLH—1 to 16 to a set of lines 77. The lines 77 extend directly to the 13LH accumulator magnets. These are also branch circuits from the 77 lines which extend through the manually set contacts 28 and the relay set contacts 78a to lines 79 which extend over to certain 13LH accumulator magnets at the left of the LH accumulator. There is accordingly a double entry of left hand components of products into the LH accumulator, the entry being duplicated in different columns or zones of the accumulator. The control of relay contacts 78a is by relay coil 78. Coil 78 is energized under the control of a commutator 80 (Fig. 1c) which commutator is associated with the column shift switch mechanism. This commutator 80 is disposed upon and fixed to shaft 343 which is shown in Fig. 55 of British Patent No. 405,031 and the corresponding French patents. The conducting section of the commutator 80 is such that relay magnet 78 will be energized at times when the column shift mechanism in standing either in the units order, the tens or the hundreds order and coil 78 will be de-energized by the action of the commutator after the column shift has passed beyond the hundreds order.

The foregoing described operations will have entered the right hand components of partial products into the RH accumulator and will have made a duplicated entry of left hand components of partial products into the LH accumulator. Multiplying operations will follow for succeeding successive denominations of the multiplier for the tens and hundreds orders in the manner described in the aforementioned patents.

It may be explained that after multiplication has been completed in the units order, the brush 81 will traverse the spots and successively energize the magnets 72. Brush 81 corresponds to brush 292 in Fig. 61a of British Patent No. 405,031 and magnets 72 correspond to magnets 311 of that patent.

The next operation which the machine performs is to gather the RH components of partial products together with the LH components of partial products. The operation which is performed is to transfer the RH components into both sections of the LH register to add the RH components to the two sets of LH components.

It has been previously explained that the multipliers comprises a maximum of three columns. The multiplier entry receiving device and the associated readout had additional columns. The column to the left of the highest denomination of the multiplier, viz. the thousands order column of the MPRO readout will stand on zero, no entry being made in this order. Accordingly, following the setting of brush 74 on the thousands order CSB and CSA spots, the brush will shift over the thousands order CSB and CSA spots and will come to rest on the tens of thousands CSA and CSB spots. In this tens of thousands order of the MP entry device, there is a set up of 9, 9 having been arbitrarily entered therein in the previously described manner. Accordingly, upon closure of cam contacts CC—8 current will flow from line 52 through these contacts, through the switch contacts of switch 27 now in the position shown to the tens of thousands CSB spot, through brush 74 to the CSA spot in the related order to the 9 spot of the MPRO readout, out via line 82, through one of the contacts of switch 26 to coil 83, to energize the same. With coil 83 energized (see Fig. 1d) two groups of relay contacts 83a and 83b will become closed. With transfer emitter 84 in operation, impulses will be emitted through the RHRO readout through certain of the 29 switch contacts, through the now closed 83a and 83b contacts and such impulses will flow out through two sets of lines 85 and 86 which extend over to the LH accumulator. The 86 lines extend directly to the accumulator magnets at the right hand side of the LH accumulator and the 85 lines extend directly to certain accumulator magnets in certain columns of the left hand section of the LH accumulator.

By the foregoing operation the RH components of products will be transferred over and added to the double sets of LH components in the LH accumulator.

It may be here explained that at the completion of the foregoing operation, there will be standing in the right hand section of the LH accumulator the product of $A \times B$ and in a part of the left hand section there will be standing the product of $A \times B$ augmented by the term C which was entered directly into this section from the card.

The machine is now ready to add to the amount of $A \times B + C$ standing in a part of the left hand section the further supplemental terms D and E which were derived from the card. It will be recalled that such terms D and E were entered into certain unused columns of the RH accumulator at the left hand end of such accumulator.

It may be explained that in the further operation the machine enters the E term first and follows with the entry of the D term. After the RH components have been transferred over into the LH accumulator the brush 74 will shift to the hundred thousand position and complete a circuit through wire 87 (Fig. 1a), through the contact of the switch 26 and energize a relay coil 88. Relay coil 88 (see Fig. 1d) when energized, closes relay contacts 88a. With these contacts closed and with the emitter 84 in operation, there is a readout of the E term from the RHRO readout and an entry of such term via certain of lines 85 into a section of the left hand part of the LH accumulator. At the completion of the foregoing operation, there will be standing in this section $A \times B + C + E$. After this transfer has been made, brush 74 (Fig. 1a) will shift to the millions order and allow a circuit to be completed from the eight spot of the readout to a wire 89 to energize a relay magnet 90. Relay magnet 90 (see Fig. 1d) controls relay contacts 90a and with the emitter 84 in operation upon the next cycle, the D term will be read out from the RHRO readout and will be entered into the LH accumulator in the left hand section. There will now be standing in this left hand section of the LH accumulator the intermediate result $R-1$ or $$(A \times B) + C + E + D$$

It has been explained that the machine as a part of its operation inspects, so to speak, the relative size of the intermediate result $R-1$, which is equal to $(A \times B) + C + E + D$. The size of the intermediate result is in part dependent upon the number of columns in the LH accumulator which are occupied by the intermediate result $R-1$.

Before explaining the manner in which the tax amount is ascertained, it may be explained that if the intermediate result $R-1$ is any amount from one cent to $9.99, no tax whatsoever is imposed. On the other hand, if the amount is anywhere between $10.00 and $99.99, a tax of 25 cents is imposed. If the amount is anywhere between $100.00 and $999.99, a tax of 50 cents is imposed. Likewise, if the amount is anywhere within the range beginning at $1,000.00 and ending at $9,999.99, a tax of $1.00 is imposed.

As shown, the LH accumulator has sixteen columns. The seven columns to the right are the part of the accumulator which are reserved for the product of $A \times B$. The next seven columns, viz. 8 to 14, inclusive, are reserved for the intermediate result $R-1$. These can accordingly be considered a distinct and separate intermediate result accumulator and the eighth columns of the LH accumulator can be considered the units column of the $R-1$ result accumulator.

The ascertaining of a tax is made in two ways. It will be convenient to consider first, the ascertaining of the 25 cents tax for $R-1$ results running between $10.00 and $99.99. An amount in the fourth column of the $R-1$ accumulator may come either from a direct entry into the accumulator or from a carry-over from a relatively lower column of the accumulator. The machine accordingly ascertains the 25 cents tax in two ways. One determination is based on whether or not a direct entry is made in the fourth order of the $R-1$ section of the LH accumulator. The other determination which is made is the determination of whether there has been a carry-over into the fourth order from the third order. The $R-1$ result accumulator in its third order is provided with a carry-contact. This contact is similar to the contact 398 in Fig. 30a of British Patent No. 405,031 and is controlled in a similar manner upon a carry out from the third order column. Likewise the fourth column of the $R-1$ accumulator is provided with an "entry" contact similar to 398 of Fig. 30a of the British patent and which contact becomes closed upon any direct entry into that order of the accumulator.

The aforementioned contacts may be conveniently termed "carry" and "entry" contacts. A carry contact is likewise provided on the fourth order of the intermediate result accumulator and an entry contact is provided on the fifth order. A carry contact is provided on the fifth order and an entry contact is provided on the sixth order. There is also an entry contact on the seventh order.

Referring to the circuit diagram (Fig. 1e), 91 are "carry" contacts similar to 398 of Fig. 30a of the British patent, 92 are "entry" contacts similar to contacts 395 (Fig. 29 of the British patent). The contacts 91 and 92 are also given a suffix "3", "4", "5", "6" and "7", signifying the third, fourth, fifth, sixth, and seventh orders of the $R-1$ section of the LH accumulator. Contacts 91—3 and 92—4 cooperate together to ascertain that a tax of 25 cents is to be imposed. These contacts when closed, energize a coil 93 which may be called the control coil to impose a 25 cents tax. Coil 93, when energized closes related relay contacts 93a which are stick contacts to maintain coil 93 energized. Contacts 91—4 and 92—5 control the energization of a coil 94 with stick contacts 94a and this coil 94 imposes a 50 cents tax amount. Contacts 91—5 and 91—6 and 92—7 control the energization of a relay coil 95, having stick contacts 95a. Coil 95 when energized imposes a tax of $1.00. It will be further appreciated that if a 50 cents tax is to be imposed, that provision should be made for cutting off the 25 cents tax control. Accordingly, relay coil 94 controls supplemental relay contacts 94b which contacts open up if the relay coil 94 is energized, thus preventing the 25 cents tax control working if a 50 cents tax is to be imposed. Coil 95 likewise, if energized, will open up two sets of relay contacts 95c and 95b, these contacts when open respectively prevent the energizing of coils 94 and 93 when a $1.00 tax is to be imposed.

From the foregoing, it will be understood that by the time the entry of all of the amounts into the intermediate result accumulator have been completed, there will be either none of the coils 93, 94 and 95 energized, provided the amount was one only up to $9.99 or one of the coils 95, 94 or 93 will be energized depending on the magnitude of the intermediate result and which increment of tax is to be imposed. The set-up of these coils will have been completed at the time the complete entry of the various components has been made into the intermediate result accumulator. It may be explained that if none of the coils 95, 94 or 93 be energized, that no tax is to be imposed and in this event the machine goes through an idle cycle. The idle cycle will occur when the 74 brush (Fig. 1a) is standing in the eighth order position. Relay coils 95, 94 and 93 in addition to controlling the a, b and c contacts also control contacts 93d, 94d and 95d (see Fig. 1a). Such d contacts are normally open contacts which closed upon energization of the related coil. With brush 74 standing in the eighth position there will be an energization of coil 96, if the 93d contacts are closed. Likewise there will be an energization of coil 97 if the 94d contacts are closed and an energization of coil 98 if the 95d contacts are closed. Coil 96 is the 25 cent coil, 97 the 50 cent coil and 98 the dollar tax coil. These coils 96, 97, and 98 are relay coils controlling related contacts shown on Fig. 1d. The contacts are correspondingly labeled with the suffix "a", viz. 96a, 97a and 98a. On Fig. 1d, the coil 95 is also shown with supplemental contacts 95e and 95f. Upon energization of coil 95 contacts 95e open and contacts 95f close.

Referring to Fig. 1d, it will be noted that there are four 96a contacts. The 96a contacts are to direct the entry of a 25 cents tax amount. This tax amount of 25 cents it will be recalled, is to be added to the intermediate result R—1 itself and is to be also set up in the, up to now, unused columns of the LH accumulator at the extreme left of the accumulator. There are, accordingly, four of the 96a contacts. The 96a contacts, as shown in the wiring diagram, are connected to the 2 and 5 impulse lines in the cable 67 and circuits are also extended from the other side of these contacts to the 13LH accumulator magnets.

Considering the left hand section of the LH accumulator as a separate accumulator or intermediate result accumulator, the 25 cents entries are made into the first and second order of this accumulator. They are also made at the extreme left hand end of the same accumulator into the heretofore unused columns.

The 97a contacts are to control the entry of a 50 cent amount. The entry of 50 cents in reality is an entry of 5 in the second order and as the entry is to be duplicated, two contacts 97a are provided. They are connected to the "five" impulse lines in the cable 67 and to the proper 13LH counter magnets. For the imposition of a $1.00 tax into the intermediate result section of the LH accumulator, one pair of contacts 98a is provided. These being connected to the "one" impulse line in the cable 67. It may be mentioned that the LH accumulator herein shown does not have sufficient columnar capacity to add a $1.00 tax in the extreme left hand or tax section of this accumulator. Accordingly, a special control has to be provided for the $1.00 tax. In place of providing for a $1.00 entry into the tax section of the LH accumulator, provision is made for controlling the direct punching of a $1.00 amount on the record card and for controlling such punching without having to set up the amount of $1.00 in the tax section of the accumulator. This control for directly punching the $1.00 tax is provided for by contacts 95e and 95f. While the recording of the results will be subsequently described the recording of the $1.00 tax amount will be described at this point because it is related to this particular tax control.

Referring to Fig. 1e, it will be noted that there is an extra plug socket 21 to the left and to which no connection is made to the LHRO—2 readout. A plug connection is provided to this socket from socket 20 (Fig. 1d). If a $1.00 tax is to be perforated, current supply will be provided to socket 21 when the readout strip has passed beyond the last column from which amounts are derived from the LHRO—2 readout and current will flow through the plug connection from 21 to socket 20, thence through contacts 95f which are closed at the time a $1.00 tax is to be imposed and back down via line 99 to the number one cross-bus of the LHRO—2 readout and over to the number one interposer magnet 204. Accordingly, the number one interposer magnet will be energized and one will be punched in this column of the card. On the other hand, if the tax to be imposed is either 25 cents or 50 cents, means must be provided so that one will not be punched and a zero will be punched in this column of the card. This is provided for by the other circuit 100 which extends up to contacts 95e. 95e are normally closed contacts, being closed when magnet 95 is not energized and such line 100 extends down (see Fig. 1e) to the zero bus line of the LHRO—2 readout and with switch 24 in the position shown the zero interposer magnet 204 will be energized.

On Fig. 1e, associated with the plug board which is provided intermediate the LHRO—2 readout and the usual readout strip to the punch, legends have been placed to show the different zones in which the different results are recorded. In this figure, it shows that the right hand seven columns are allotted for the product of $A \times B$. The next seven columns are allotted for the final result. The next two columns of the accumulator are for the 25 cents and 50 cents tax entry and the column beyond the left hand end of the accumulator is for the $1.00 tax entry.

After the cycle is completed, in which the last tax entry is made into the result accumulator, the machine on the following cycle resets the multiplicand and multiplier accumulators.

After the various transfer over cycles have been completed, a l of the coils 72 will be energized and their corresponding transfer relay contacts 72a (Fig. 1a) will be in shifted over position. With such contacts shifted and with cam contacts CC—4 closed, relay coils RHLH will be energized. The energization of these coils is brought about in the manner fully described in the aforementioned British and French patents, which brings about closure of contacts RHA and RHB (Fig. 1d) so that upon the next cycle with the emitter 84 in operation, current will flow from the line 53, through LHE now closed, through the first extra spot of the emitter, up through contacts RHB, via wire 101 to energize the 102MC reset magnet. The 102MP reset magnet is likewise energized, this receiving its supply of current through the wires 103 and 104 in the now closed switch 23 (see also Fig. 1c). The MP and MC entry devices are then reset in the manner described in the aforementioned foreign patents.

During the reset of the multiplicand entry device, contacts 105 (Fig. 1a) (298 of British Patent No. 405,031) close to energize the 102RH reset magnet and to bring about reset of the RH accumulator in the following cycle.

Punching is initiated also in the cycle following the MC and MP reset in the same manner described in the foreign patents, viz. by means of emitter 84 (Fig. 1d) encountering an extra spot and supplying current through RHA to a coil 106 which corresponds to coil 306 in Fig. 61c of British Patent No. 405,031. When coil 106 is energized, contacts LHC (Fig. 1e) close and relay coil B is energized upon closure of cam contacts CC—3. Coil B sticks through relay contacts B—1 and contacts LHC now closed. With relay coil B energized, current supply is provided for the punch for punching out the product. The operation of the punch need not be here further described, since it is identical with that of the aforementioned foreign patents. It is sufficient to state that the punch is of the successive acting type, punching column by column and that the punch successively punches the tax, the final result or R and the product or A×B. This is effected in the customary manner by a readout from the LHRO—2 readout, except for the $1.00 tax item which is controlled in the special manner previously described.

After punching is complete and the card has passed to beyond the last column position in the punch, contacts P—5 (Fig. 1a) will close and with these contacts closed, upon closure of cam contacts CC—7 current will flow through the now closed LHD contacts (which contacts were closed by the energization of magnet 106, Fig. 1d) to the 102LH reset magnets. Reset of the LH accumulators will now be effected in the usual manner.

Following the reset of the LH accumulator, the machine is ready to re-initiate a new operation on the following card. The re-initiating circuit, upon regular multiplying operation, where the special tax computations are not involved, extends through switch 30 (Fig. 1e) which will be in closed position reverse from that shown. In this event the re-start circuit will be through the punch controlling contacts P—1, the now closed RHD contacts, the now closed LHD contacts, through the closed relay contacts C—2, through the cam contacts, through the card feed clutch magnet 69. When the machine is to be used for the special calculations with which the present invention is concerned, this normal re-start circuit is interrupted by opening the switch 30 and the restart circuit is in the following path: from the punch control contacts P—1, through RHE, which become closed upon the reset of the RH accumulator, through relay contacts 71a, which are controlled from the master controlling magnet 71 (see Fig. 1a) of the cycle controller, through cam contacts CC—1, through contacts LHF which become closed upon reset of the LH accumulator, through the relay contacts C—2, through the cam contacts FC—6 to the clutch magnet 69. The reason for providing the special re-start circuit just traced is because the re-start circuit used on regular multiplying would prematurely begin feeding of cards. The contact which actually initiates re-start under the conditions when special computing is being effected is the LHF contact which becomes closed upon reset of the LH accumulator.

There is a further circuit which may be briefly alluded to, although it does not have particular function in the special computations which are the subject matter of the present invention.

During any card feed cycle, cam contacts FC—9 close, energizing relay coil K (see Fig. 1e). A stick circuit is provided for K, through relay contacts K—1 which extend back through magnet control contacts 71a, contacts RHE and P—1. The relay coil K has supplemental contacts K—2 which cooperate with relay contacts F—1 to control the master cycle controller magnet 71. This particular circuit has no special function in the special problems which are computed by the machine and which form the subject of the present invention.

It may be further mentioned that after the card has been punched and it passes beyond the last column position in the punch, the card is ejected from the punch in a manner fully described in the aforementioned French and British patents. Several circuits which are fully described in the patents referred to have not been specifically traced herein, but the circuits are illustrated and the contacts and relays included therein are given the reference characters of the British Patent No. 405,031 to facilitate tracing the same. These include in Fig. 1e contacts 249, 209, 296, 297, 395, 398, 398a, 515, and 516, and magnets 204, 205, 240, and 399. In addition, several legends have been applied to more readily identify the devices.

A typical computation performed by the machine is shown in Fig. 2. In this figure, the card is shown at the top and the full lines represent the flow of the entries from the card to the various entry receiving devices. It will be noted that the multiplicand term A goes to MC, the B term to the MP device, the D and E terms to allotted columns at the left hand side of the RH accumulator and the C term to the allotted columns in the left hand portion of the LH accumulator. At the time of card entry into the MP accumulator, there is an entry from a fixed set up device of an amount of 9899 into columns of the MP entry device to the left of those receiving the MP entry itself. The short dashed lines show the flow of partial product results to the RH and LH accumulators.

It will be noted that there is a duplicated entry of the left hand components of products into the left and right hand sections of the LH accumulator. The dot and dash lines with a single dot show the manner in which the RH components of products are transferred over and added to the LH components of products in the LH accumulator. The dot and dash lines with multiple dots show the manner of entry of the D and E terms into the left hand portion of the LH accumulator. The dot and dash lines leading from the fixed set up device show the manner of entry of the tax amount into the left hand section of the LH accumulator. This is a selected entry which is dependent upon the magnitude of the amount already standing in this portion of the accumulator. The heavy dotted lines at the bottom show the recording of the result on the record card, one of the dotted lines showing the manner in which the dollar tax is recorded in the event that the tax is determined to be a dollar.

What I claim is:

1. In a machine of the class described, an accumulator having a plurality of denominational orders, means for entering an amount therein, means for determining whether an entry of any amount is effected in certain denominational orders and means controlled by said determining means for causing said entering means to effect a supplemental entry into the accumulator.

2. In a multiplying machine provided with multiplying mechanism, amount transferring mechanisms, and a cycle controller; the combination of an entry receiving device having a plurality of denominational orders, means for entering one amount in certain of said orders and another amount in certain others of said orders, a member controlled by said cycle controller for cooperating with each of said orders in succession, means controlled by each order containing a significant digit of said first amount during the cooperation of said member therewith for causing an operation of said multiplying mechanism and means controlled by each order containing a digit of said second amount during the cooperation of said member therewith for causing successive operations of said transferring mechanisms.

3. In a machine of the class described, an accumulator having a plurality of denominational orders, means for entering an amount therein, means controlled by a predetermined denominational order of said entering means for determining whether a digit is being entered in one of said orders, and means controlled by said determining means for controlling the subsequent operation of the entering means of the accumulator to enter a predetermined fixed amount.

4. In a machine of the class described, an accumulator, entering means therefor, record controlled means for causing said entering means to enter an amount in said accumulator, a plurality of supplemental means for causing said entering means to enter any of a plurality of predetermined amounts into said accumulator, selecting means cooperating with said supplemental means and means controlled by predetermined digital elements of the entering means when a significant digit entry is made thereby for controlling the operation of said selecting means to select a predetermined one of said supplemental means to cause entry of a predetermined amount under control thereof.

5. In a machine of the class described, an accumulator with tens carry mechanism included therein, entering means for the accumulator, means for causing said entering means to enter an amount in said accumulator, supplemental means for causing said entering means to enter a further predetermined multidenominational amount into said accumulator, and means controlled by predetermined digital elements of the tens carry mechanism for controlling the operation of said supplemental means.

6. In a machine of the class described, an accumulator, entering means therefor, record controlled means for causing said entering means to enter an amount in said accumulator, supplemental means for causing said entering means to enter a different predetermined multidenominational amount into said accumulator and means controlled by a predetermined digital element of the accumulator when an initial significant digit entry is made therein for controlling the operation of said supplemental means.

7. In a machine of the class described, an accumulator, entering means therefor, record controlled means for causing said entering means to enter an amount in said accumulator, supplemental means for causing said entering means to enter a different predetermined multidenominational amount into said accumulator and means controlled by predetermined digital elements of the accumulator and predetermined digital elements of the entering means jointly, for controlling the operation of said supplemental means.

8. In a machine of the class described, an entry receiving device, entering means therefor, a second entry receiving device, entering means therefor, means for causing the entering means of said first-named device to enter an amount therein, further means for causing the entering means of the second entry receiving device to enter a fixed multidenominational amount into the second entry receiving device, and means controlled by a digital element of the first entry receiving device for controlling the operation of said further means.

9. In a machine of the class described, an entry receiving device, entering means therefor, a second entry receiving device, entering means therefor, means for causing the entering means of said first-named device to enter an amount therein, a plurality of devices for causing the entering means of the second entry receiving device to enter predetermined fixed amounts therein and means controlled by predetermined denominational elements of the first-named entry receiving device for selectively controlling the operation of said plurality of devices to cause selective entry of fixed amounts in said second entry receiving device.

10. In a cyclically operated multiplying machine, a multiplicand receiving device, a multiplier receiving device, and a plurality of amount receiving devices, devices for effecting variable entries in each device, said multiplier device being arranged and constructed with separate sections, one to receive a variable multiplier and the other a fixed amount, means for effecting entry of said fixed amount in said last section, a result receiving device, a cycle controller cooperating with said multiplier receiving device and including means cooperating with said sections in succession, multiplying means controlled by said multiplicand receiving device and the multiplier receiving section of said multiplier receiving device during the cooperation of said cycle controller with the section of the multiplier device containing the multiplier to cause computation of the product of the amount in said multiplicand receiving device and said multiplier and the obtaining of said product in said result receiving device, and means controlled by said cycle controller during the cooperation thereof with the section containing said fixed amount for causing the amounts in said plurality of receiving devices to be successively transferred to said result receiving device.

11. The invention set forth in claim 2 in which presettable means is provided for preventing operation of said transferring mechanisms and for causing all of said orders containing a significant amount to cause an operation of said multiplying mechanism during the cooperation of said member with said orders.

GEORGES ZIGUELDE.